Oct. 27, 1970   P. GNOTH   3,535,956

DRILL JIG GUIDE SLEEVE ASSEMBLY

Filed April 18, 1968   3 Sheets-Sheet 1

INVENTOR.
PETER GNOTH
BY Beehler & Arant
ATTORNEYS

Oct. 27, 1970  P. GNOTH  3,535,956

DRILL JIG GUIDE SLEEVE ASSEMBLY

Filed April 18, 1968

INVENTOR.
PETER GNOTH

BY Beehler & Arant

ATTORNEYS

Oct. 27, 1970  P. GNOTH  3,535,956

DRILL JIG GUIDE SLEEVE ASSEMBLY

Filed April 18, 1968  3 Sheets-Sheet 3

INVENTOR.
PETER GNOTH
BY Beehler & Arant
ATTORNEYS

United States Patent Office 3,535,956
Patented Oct. 27, 1970

3,535,956
DRILL JIG GUIDE SLEEVE ASSEMBLY
Peter Gnoth, Aldingen, Germany, assignor to American Drill Bushing Company, Los Angeles, Calif., a corporation of Maryland
Filed Apr. 18, 1968, Ser. No. 722,396
Int. Cl. B23b 49/02
U.S. Cl. 77—62     11 Claims

ABSTRACT OF THE DISCLOSURE

The disclosure comprehends a drill block provided with a guide sleeve for a twist drill, the guide sleeve being anchored in the drill block against rotation and also against movement axially of the sleeve. The sleeve has a cylindrical exterior, one end of which is grooved and a section of heavy wire encircles the sleeve for a distance in excess of one half the perimeter and within the groove, where it is anchored by some adhesive means, as for example welding, soldering, or metal glue. Additionally, a section of the wire is bent so that the bent portion can engage the surface of the drill block and in this way inhibit endwise shifting of the sleeve in the block. A threaded stud which engages the drill block has a position spaced a short distance from the sleeve so that the wire engages the stud whereby to prevent rotation of the sleeve when the drill is injected into it.

---

Drill jig guide sleeves generally have long been in use for locating production drilling operations so that a hole drilled into a workpiece is drilled in the proper location. The sleeves are customarily of hardened metal to resist wear, and thus constructed are adapted to be used repeatedly for long periods before they require replacement. Customarily, the sleeves are provided with a head larger in diameter than the body of the sleeve thereby to limit endwise movement of the sleeve into the drill block when they have been fastened into the drill block in various ways, as for example by a threaded stud with a relatively large head adapted to overlie a shoulder on the sleeve. These threaded studs are intended to be removable so that the sleeve itself can be removed and replaced when worn or when, for example, a twist drill of different diameter might be needed.

Necessarily, when a sleeve having a head is employed, there is expense involved in the forming operation since usually the stock must be as large in diameter as the head and the stock then machined to a smaller diameter throughout that portion which is to be inserted in a bore in the drill block. Obviously, there is an excess of metal which must be paid for and disposed of and attendant machining operations which are costly to a degree.

Among the objects of the invention is to provide a new and improved drill jig guide sleeve which is relatively inexpensive in that simple, inexpensive forms of raw material are used, such for example as a tubular shaft and wire assembled together in a form so as to serve as a drill jig guide sleeve.

Another object of the invention is to provide a new and improved drill jig guide sleeve wherein the usual head is omitted and wherein a wire member is substituted therefor, the wire member being deformed in such fashion as to serve the double purpose of inhibiting the sleeve against rotation and also preventing it from being shifted endwise in the drill block.

Still another object of the invention is to provide a new and improved drill jig guide sleeve which is so designed and constructed as to reduce to an appreciable extent the fabricating cost.

Also included among the objects of the invention is to provide a new and improved drill jig guide sleeve which despite its inexpensive and simplified construction is a dependable and accurate tool accessory.

With these and other objects in view, the invention consists in the construction, arrangement, and combination of the various parts of the device, whereby the objects contemplated are attained, as hereinafter set forth, pointed out in the appended claims and illustrated in the accompanying drawings.

Figure 1:
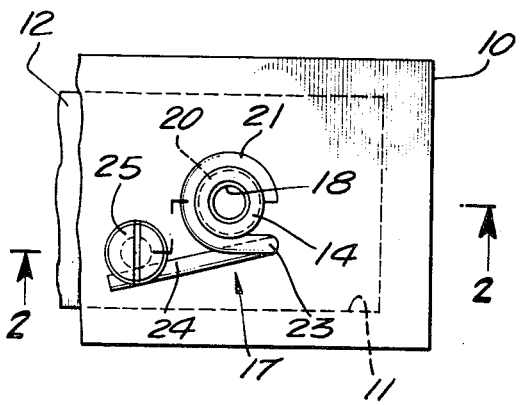
FIG. 1 is a plan view of a drill block showing one form of the invention placed thereon.
Figure 2:
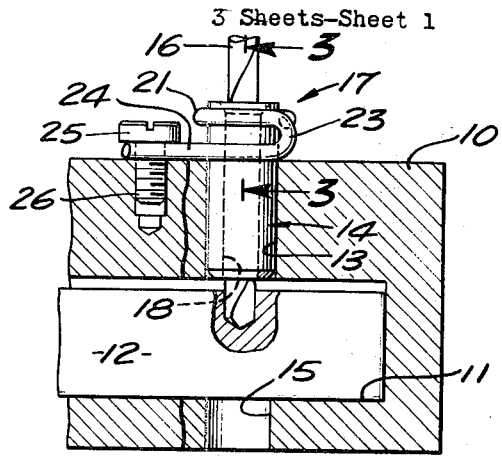
FIG. 2 is a longitudinal sectional view on the line 2—2 of FIG. 1.
Figure 3:
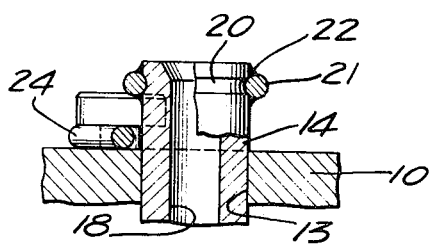
FIG. 3 is a longitudinal sectional view on the line 3—3 of FIG. 2.

In an embodiment of the invention chosen as a first form for illustration there is shown a drill block 10 provided with a positioning slot 11 in which is located a workpiece 12. In the drill block is a bore 13 adapted for reception of a drill jig guide sleeve indicated generally by the reference character 14. A clearance hole 15 is in axial alignment with the bore 13 to accommodate a conventional twist drill 16 when it is driven through the workpiece 12.

Figure 4:
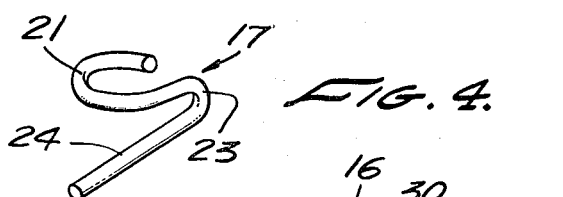
FIG. 4 is a perspective view of the wire member.
Figure 5:
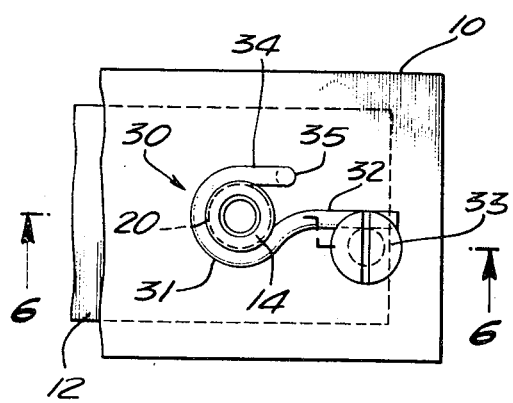
FIG. 5 is a plan view of a second form of the invention in place in a drill block.
Figure 6:
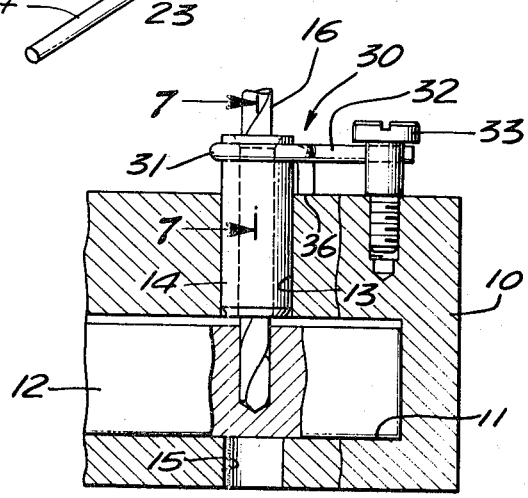
FIG. 6 is a longitudinal sectional view on the line 6—6 of FIG. 5.
Figure 7:
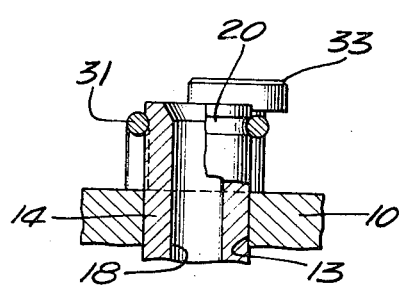
FIG. 7 is a longitudinal sectional view on the line 7—7 of FIG. 6.
Figure 8:
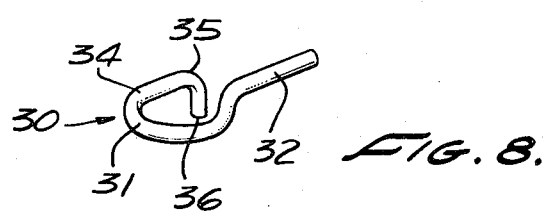
FIG. 8 is a perspective view of the wire member of FIGS. 5 through 7.
Figure 9:
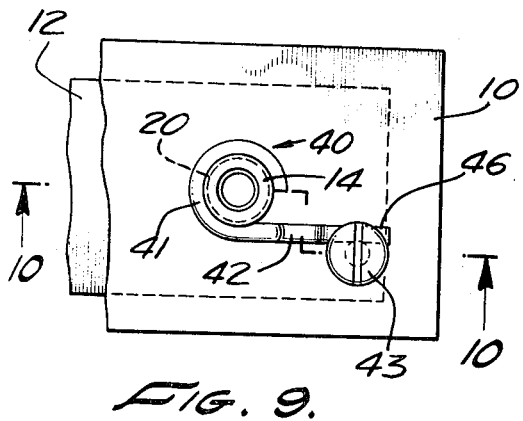
FIG. 9 is a plan view of another form of the invention in place in a drill block.
Figure 10:
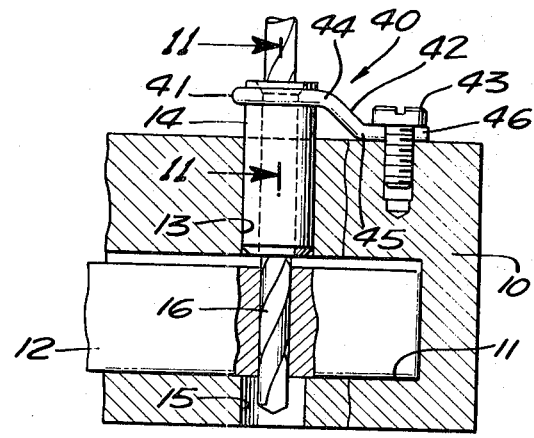
FIG. 10 is a longitudinal sectional view on the line 10—10 of FIG. 9.
Figure 11:
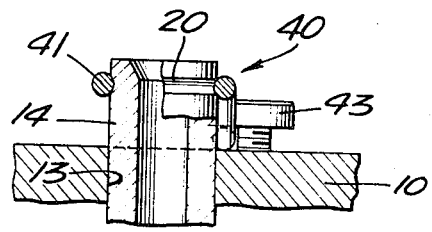
FIG. 11 is a longitudinal sectional view on the line 11—11 of FIG. 10.
Figure 12:
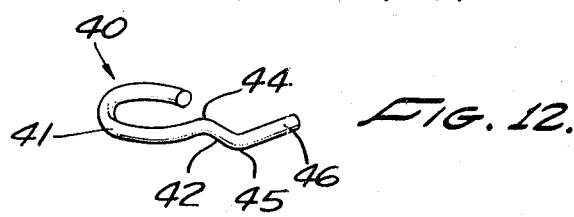
FIG. 12 is a perspective view of the wire member of FIGS. 9 through 11.

The drill jig guide sleeve is made up into an assembly with a wire member indicated generally by the reference character 17 and shown in perspective view in FIG. 4.

The drill jig guide sleeve is generally tubular in form and provided with a central axial passage 18 to accommodate the twist drill 16. Although the drill jig guide sleeve in the chosen embodiment is a right circular cylinder, it will be understood that the exterior circumference is not limited to a rounded or circular form but contemplates exterior forms of various shapes which are substantially uniform from end to end and devoid of protuberances.

Adjacent one end of the wire member 17 is a perimetral groove 20 which customarily extends throughout the entire perimeter. A portion 21 of the wire member 17 is clamped within the groove 20 and preferably extends more than half way around the perimeter so as to positively encircle the drill jig guide sleeve 14. To further assure that there will not be any rotation between the drill jig guide sleeve and the wire, it is preferable to fasten the wire to the sleeve by some means, such for example as metal glue 22, welding, or soldering, especially on those occasions where the sleeve is of rounded exterior rather than being of noncircular cross-sectional shape.

In the form of device of FIGS. 1 through 4 inclusive, the wire encircles the sleeve throughout an angle of substantially 270°. Another portion 23 of the wire extends outwardly for a short distance in a direction tangential to the sleeve 14. A bend of substantially 180° made so that the outermost portion of the wire extends in reverse direction as clearly shown in FIG. 2, whereby a straight section 24, bent outwardly at an angle of about 15° from the portion 23, as shown in FIG. 1, lies entirely clear of the sleeve.

A threaded stud bolt 25 has a threaded shank 26 in threaded engagement with the drill block 10 and is preferably threaded into position finger-tight. The stud bolt 25 is in such location that it has a position of engagement with the straight portion 24 of the wire and serves the double purpose of holding the wire down against an upper face of the drill block and preventing rotation of the assembly of sleeve and wire when the twist drill 16 is operated in conjunction with it. Similarly, the wire member serves a double purpose in that the straight portion 24, by being brought into engagement with the adjacent face of the drill block, positions the sleeve 14 with respect to the block in an axial direction, as determined by the length of the 180° bend in the portion 23. Moreover, fastened as described the wire member also prevents the sleeve from rotating during use.

In a second form of the invention illustrated in FIGS. 5, 6, 7, and 8 a wire member 30 has a slightly different form. In this instance a portion 31 encircles the groove 20 in the sleeve 14 for about 270°, but a portion 32 which extends outwardly from the sleeve is straight and engages a stud bolt 33 at a location spaced substantially from the adjacent face of the drill block 10. The portion 32 moreover is at a location such that its axis is substantially in alignment with the axis of the sleeve 14 rather than being in tangential relationship. A second outwardly extending portion 34 at the other end of the wire member 30 does extend a short distance tangentially and then has a 90° bend 35 so that an end 36 can be brought into direct physical contact with the adjacent face of the drill block and in this way position the sleeve 14 with respect to endwise movement relative to the drill block. In this instance also, some adhesive means such as metal glue, a weldment, or solder may be employed to anchor the wire member to the sleeve.

In the form of invention of FIGS. 9, 10, 11 and 12 the wire member 50 having a portion 51 encircling the sleeve 14 and a portion 52 extending tangentially as shown in ing in a substantially tangential direction outwardly into engagement with a stud bolt 43. In this instance, the portion 42 has a 45° bend 44 connecting it to the portion 41 and a second 45° bend 45 connecting it to an end section 46. Bent as described, the end section 46 engages the adjacent surface of the drill block 10 and positions the sleeve 14 endwise with respect to the drill block 10. At the same time, the end section 46 by being brought against the side of the stud bolt 43 prevents rotation of the sleeve 14 when in use.

Figure 13:
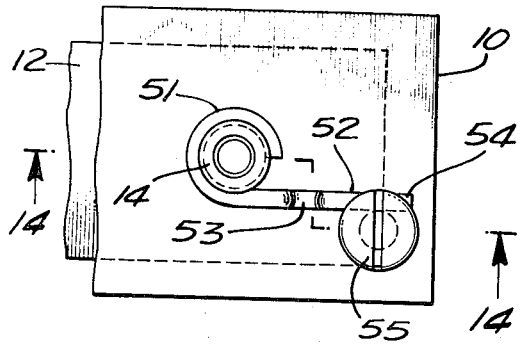
FIG. 13 is a plan view of still another form of the invention in place in a drill block.
Figure 14:
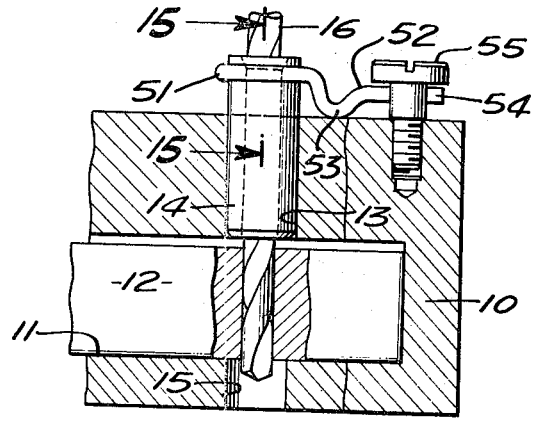
FIG. 14 is a longitudinal sectional view on the line 14—14 of FIG. 13.
Figure 15:
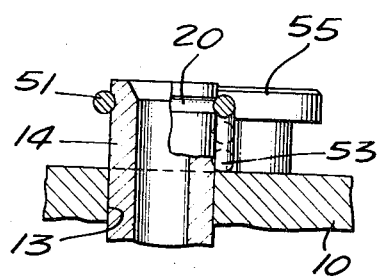
FIG. 15 is a longitudinal sectional view on the line 15—15 of FIG. 14.
Figure 16:
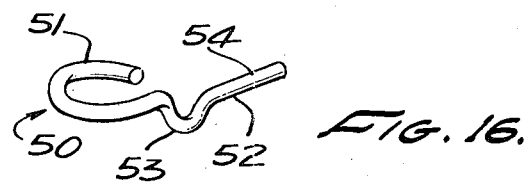
FIG. 16 is a perspective view of the wire member of FIGS. 13 through 15.

As evidence of still an additional configuration which may be given to the wire member within the scope of the invention, there is shown in FIGS. 13, 14, 15, and 16 a wire member 50 having a portion 51 encircling the sleeve 14 and a portion 52 extending tangentially as shown in FIG. 13. The portion 52 includes a loop 53 which extends in a direction parallel to the axis of the sleeve 15 so that it is adapted to engage the adjacent face of the drill block 10. The loop 53 is of such configuration that a section 54 at the end of the portion 52 is at a location spaced from the adjacent face of the drill block 10 where it is brought into engagement with a stud bolt 55 to prevent rotation of the sleeve during use and by means of which additionally the sleeve may be held within the bore 13 of the drill block in its selected position.

Figure 17:
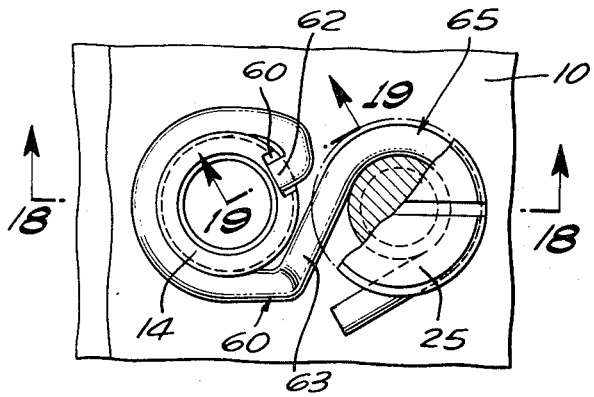
FIG. 17 is a plan view of another form of the device.

In the form of invention of FIGS. 17 through 21 the stud bolt 25 is set much closer to the bore which accommodates the drill jig guide sleeve and prompts a slightly different modification of the wire member. In FIG. 17 for example, a wire member indicated generally by the reference character 60 is wrapped around the drill jig guide sleeve 14 at the bottom of the perimetral groove 20 in a manner similar to the forms of the invention already described, but the ends of the wire member are somewhat differently employed. An axially extending slot 61 on the exterior of the drill jig guide sleeve 14 cuts the perimetral groove 20 in a transverse direction and the slot is open through to the upper end of the drill jig guide sleeve, as shown particularly in FIG. 19. The wire member 60 has a short, sharply bent end portion 62 which extends radially into the slot 61 thereby anchoring the drill jig guide sleeve against rotation relative to the wire member. There is also a bent portion 63 which extends at an angle in excess of 45° from the plane of the perimetral groove 20 to an adjacent surface 64 of the drill block 10, serving in this fashion to limit axial shift of the drill jig guide sleeve with respect to the drill block. A looped portion 65 encircles a spacer section 66 of the stud bolt 25 and is held in position beneath the head of the stud bolt, thus making a fixed renewable drill jig guide sleeve, and moreover, one which permits the stud bolt to be located, as required by machine shop practice, very close to the bore 13 which accommodates the sleeve.

Figure 19:
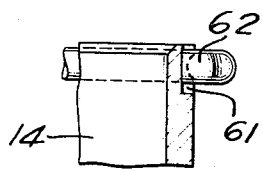
FIG. 19 is a fragmentary longitudinal sectional view on the line 19—19 of FIG. 17.
Figure 20:
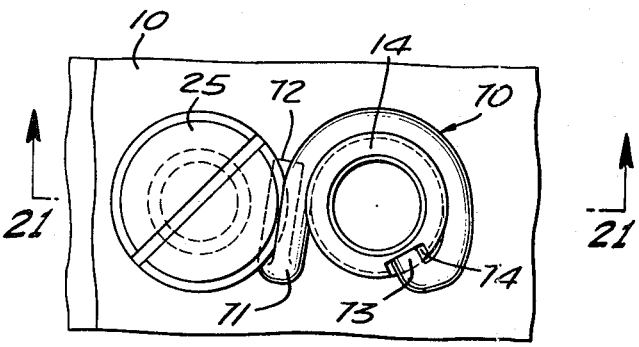
FIG. 20 is a plan view of still another modification in form of the invention.
Figure 21:
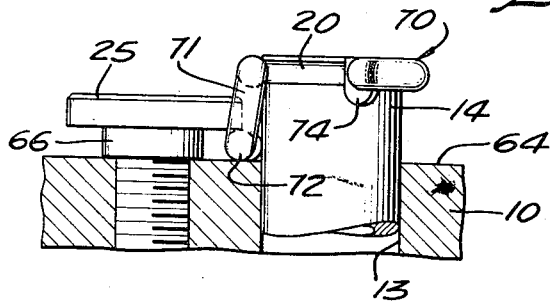
FIG. 21 is a longitudinal sectional view on the line 21—21 of FIG. 20.

In the form of invention of FIGS. 20 and 21 the drill jig guide sleeve employs a wire member indicated generally by the reference character 70 formed somewhat differently with respect to an end portion 71. In this form of the device, the end portion 71 has an endmost section 72 bent back upon itself around a bend of 180° so that the endmost section 72 lies in a position parallel to the portion of the wire member which lies within the perimetral groove 20. By having the diameter of the wire member slightly less than the clearance between the surface 64 of the drill block 10 and the head of the stud bolt 25, which clearance is determined by the length of the spacer section 66, the endmost section 72 can be slid beneath the head of the stud bolt without binding and with equal facility can be removed therefrom. Constructed and assembled in this fashion, the drill jig guide sleeve 14 can be dropped into the bore 13 and rotated into a position anchored against further rotational movement by engagement of the end portion 71 of the wire member with the stud bolt 25. The drill jig guide sleeve can be easily removed by rotating it in an opposite direction to release the end portion 71 from its position anchored under the head of the stud bolt 25 and then merely lifted from the bore 13 to allow replacement with a drill jig guide sleeve which may have, for example, a central axial passage sized to fit a twist drill of different diameter, or perhaps a reaming tool. An opposite end portion 73 anchors in an axially extending slot 74 of the same character as the slot described in connection with FIGS. 17, 18, and 19 and for the same purpose.

Figure 18:
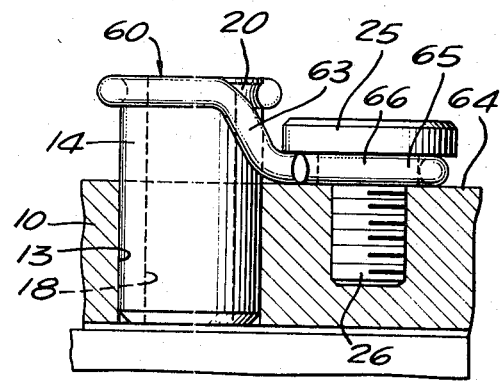
FIG. 18 is a longitudinal sectional view on the line 18—18 of FIG. 17.

In assembling a drill jig guide sleeve and a wire member like either the wire member 60 of FIGS. 17, 18, and 19, or the wire member 70 of FIGS. 20 and 21, it has been found advisable to first bend the wire member to the desired shape that it will have when ultimately assembled with the drill jig guide sleeve. The wire member is then applied endwise to the drill jig guide sleeve from the upper end as viewed in FIGS. 18, 19, 20 and 21, for example. The allowable springiness of the wire member permits it to expand sufficiently to be forced over the end of the drill jig guide sleeve and into the perimetral groove. At the same time, the exposed end of the end portion 62, or 73, as the case may be, slides endwise through the axially extending slot as the wire member is being expanded over the end and into the perimetral groove. Once in place, the wire member assumes its initial position which can be one hugging the bottom of the perimetral groove with a certain amount of spring tension while the end portion is securely anchored in the axially extending slot.

Figure 22:
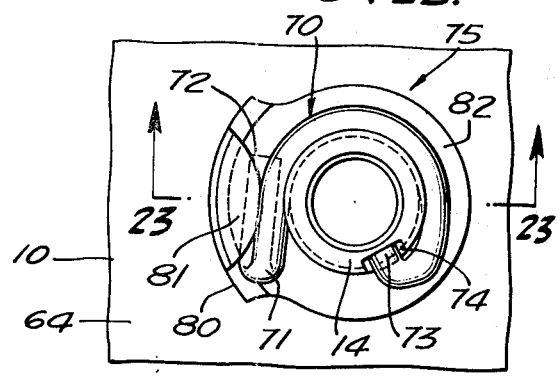
FIG. 22 is a plan view of the drill bushing of FIG. 20 in a different environment.
Figure 23:
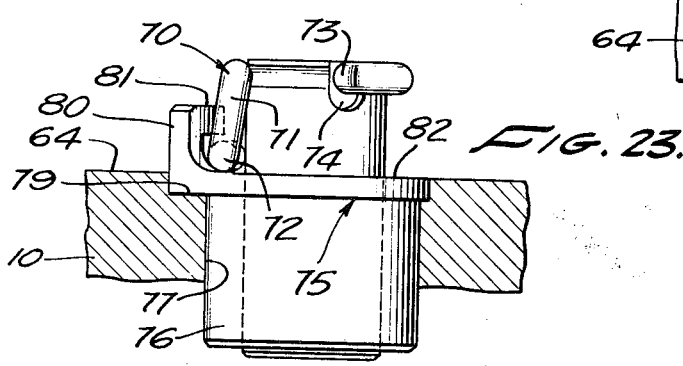
FIG. 23 is a longitudinal sectional view on the line 23—23 of FIG. 22.

FIGS. 22 and 23 show the assembly of FIGS. 20 and 21 put to use with a liner bushing 75. The liner bushing has a shank 76 which fits in a bore 77 of the drill block 10 until a collar 78 has its upper surface flush with the surface 64 of the drill block 10 by reason of being received in a recess 79. This is helpful in preventing the liner bushing from rotating relative to the drill block, although rotation may be prevented by various means other than that shown, as for example by knurling the exterior surface of the shank 76. A leg 80 extends axially endwardly and is provided with an overhanging lip 81, the under edge of which is spaced from an upper surface 82 of the liner bushing by a distance slightly in excess of the diameter of the wire member 70. The liner bushing hereinabove described is one of a currently commercially available liner bushing developed for related use.

The wire member 70 assembled as shown and described with a drill jig guide bushing 14 in connection with FIGS. 20 and 21 can therefore be used in conjunction with the liner bushing 75 as a slip renewable guide sleeve by reason of the fact that when the guide sleeve is inserted into a bore 83 of the liner bushing and rotated, the endmost section 72 will slide beneath the lip 81 and the end portion 71 will then stop against the lip 81 to prevent further rotation, while a drilling operation takes place. When the drill jig guide sleeve is to be removed, it is merely rotated in an opposite direction sufficient to release the endmost section 72 from its engagement beneath the lip 81, after which it can be removed and replaced with another.

It will be clear from the foregoing description of subject matter and assembly that inasmuch as the sleeve 14 has a uniform exterior configuration, it can be made from tubular stock or bar stock of indefinite length with parts merely cut off to desired length. When a groove like the perimetral groove 20 is employed, the forming of it is a simple operation and virtually the only machining operation needed for the sleeve 14. The other member of the assembly, namely the wire member in each instance, is a physical form of singularly inexpensive shape and can be readily given its desired configuration by a simple bending or pressing operation and engaged in such fashion with the sleeve. Accordingly, material cost is held substantially to a minimum and the forming and assembly operations are considerably simplified resulting in a drill jig guide sleeve assembly which is of low cost and of dependable construction.

While the invention has herein been shown and described in what is conceived to be a practical and effective embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A drill jig guide sleeve assembly for mounting in a drill block having a bore therethrough, said assembly comprising a tubular body having an axial bore therethrough, the exterior of all portions of said body being of diameter less than the diameter of said first mentioned bore, said body having a perimetral groove adjacent one end, and a wire member in said groove extending around said body for a distance in excess of half the perimeter.

2. A drill jig guide sleeve assembly for mounting in a drill block having a bore therethrough, said assembly comprising a tubular body having an axial bore therethrough, said body having a perimetral groove adjacent one end, and a wire member in said groove extending around said body for a distance in excess of half the perimeter, said body having an axially extending slot on the exterior communicating between the groove and the adjacent end of the body, said wire member having a bent end located in said slot whereby to key the wire member to the body to prevent relative rotation therebetween.

3. A drill jig guide sleeve assembly for mounting in a drill block having a mounting bore therethrough, said assembly comprising a tubular body of uniform exterior shape from end to end and having an axial bore therethrough, said body having a perimetral groove adjacent one end, a wire member having a first portion thereof around said body for a distance greater than half the perimeter, another portion of said wire member standing clear of said body, part of at least one of said portions comprising a configuration extending in a direction parallel to the axis of said body for a distance less than the length of said body, whereby to engage said drill block and limit insertion thereinto of said body, and means on said block at a location for engagement with said other portion of the wire member whereby to restrain said body against rotation when in use.

4. A drill jig guide sleeve assembly as in claim 3 wherein said means on said drill block is a threaded stud.

5. A drill jig guide sleeve assembly as in claim 3 wherein said body is a right circular cylindrical exterior surface.

6. A drill jig guide sleeve assembly as in claim 3 wherein there is an adhesive material connecting said first portion of said wire member to said body.

7. A drill jig guide sleeve assembly as in claim 3 wherein said body has an axial slot on the exterior communicating between said groove and the end of said body adjacent thereto, said first portion of said wire member having a bent end located in said slot whereby to key the wire member to the body to prevent relative rotation therebetween.

8. A drill jig guide sleeve assembly as in claim 1 wherein a portion of said wire member stands clear of the body and includes a section bent in a direction parallel to the axis of the body so that the bent section can engage said drill block.

9. A drill jig guide sleeve assembly as in claim 1 wherein a portion of said wire member adjacent the body has a section bent so that the end thereof extends parallel to the axis of the body whereby said end is in a position to engage said drill block.

10. A drill jig guide sleeve assembly for mounting in a drill block having a bore therethrough, said assembly comprising a tubular body having an axial bore therethrough, said body having a cylindrical external form of uniform external diameter from end to end smaller than the diameter of said first mentioned bore and a perimetral configuration adjacent one end extending radially inwardly relative to said external form, and an elongated member attached to said body at said configuration and extending around said body for a distance in excess of half the perimeter.

11. A drill jig guide sleeve as in claim 10 wherein there is an axially facing portion on said elongated member adapted to engage said block and a radially extending portion on said elongated member adapted to interconnect with said block to inhibit rotational motion of said sleeve.

References Cited

UNITED STATES PATENTS

| | | | |
|---|---|---|---|
| 2,483,686 | 10/1949 | Wing | 77—62 |
| 2,412,594 | 12/1946 | Antonidis | 77—62 |

OTHER REFERENCES

Publication: American Machinist, article entitled "Tool Engineering" by Albert A. Dowd and Frank W. Curtis, volume 54, No. 23, dated June 9, 1921, pages 997 and 998.

FRANCIS S. HUSAR, Primary Examiner